US005641927A

United States Patent [19]

Pawate et al.

[11] Patent Number: 5,641,927

[45] Date of Patent: Jun. 24, 1997

[54] AUTOKEYING FOR MUSICAL ACCOMPANIMENT PLAYING APPARATUS

[75] Inventors: Basavaraj I. Pawate; Rabin Deka, both of Ibaraki, Japan; Wallace Anderson, Richardson, Tex.; Wai-Ming Lai, Dallas, Tex.; Vishu R. Viswanathan, Plano, Tex.

[73] Assignee: Texas Instruments Incorporated, Dallas, Tex.

[21] Appl. No.: 423,184

[22] Filed: Apr. 18, 1995

[51] Int. Cl.[6] ................................ G09B 5/04; G10H 1/00

[52] U.S. Cl. ........................................ 84/609; 434/307 A

[58] Field of Search ..................... 84/609–614, 634–638, 84/645, 649–652, 666–669, 477 R, 478; 434/307 A

[56] References Cited

U.S. PATENT DOCUMENTS

| | | | |
|---|---|---|---|
| 5,296,643 | 3/1994 | Kuo et al. | 84/610 |
| 5,428,708 | 6/1995 | Gibson et al. | 395/2.16 X |
| 5,446,238 | 8/1995 | Koyama et al. | 84/669 |
| 5,447,438 | 9/1995 | Watanabe et al. | 84/645 X |
| 5,477,003 | 12/1995 | Muraki et al. | 84/610 |

*Primary Examiner*—Stanley J. Witkowski

*Attorney, Agent, or Firm*—Robert L. Troike; Leo N. Heiting; Richard L. Donaldson

[57] ABSTRACT

A Karaoke (10) apparatus with autokeying is provided by measuring the average pitch (28) of the singer or user over a predetermined time period, comparing (29) the pitch of the singer or user voice to that of a reference pitch to provide a signal representing mismatch and changing the pitch (31) of the background music to match that of the singer or user.

15 Claims, 3 Drawing Sheets

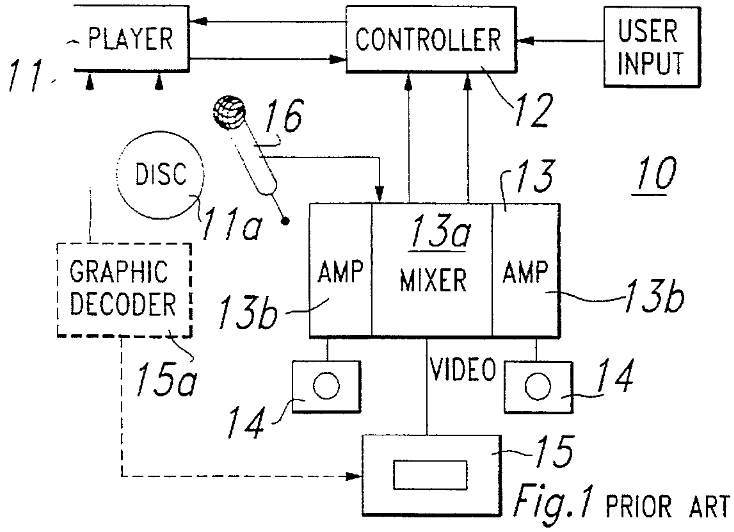
Fig.1 PRIOR ART
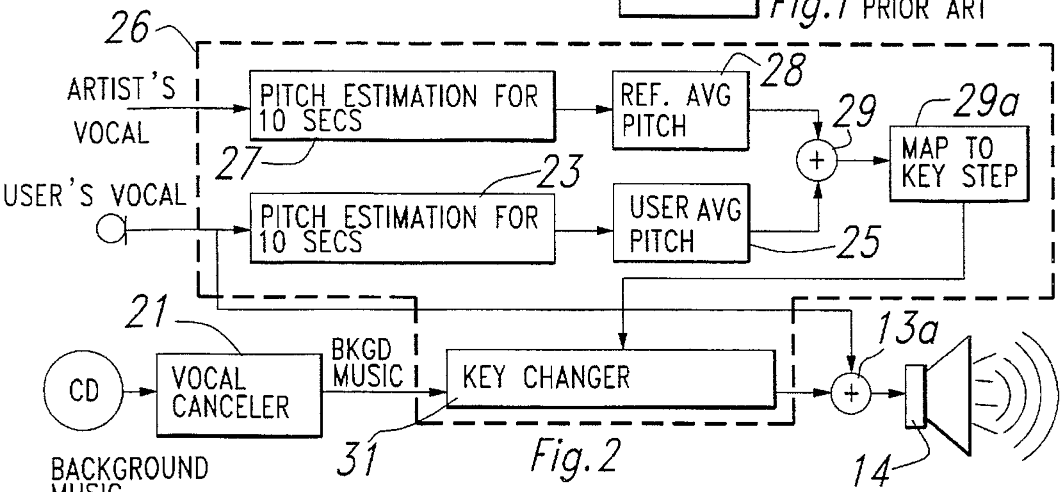
Fig.2
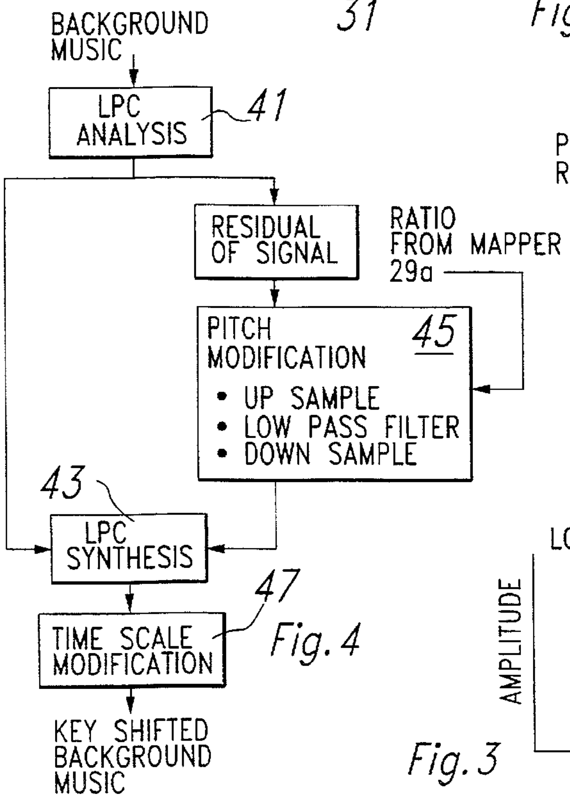
Fig.4
| PITCH PERIOD RANGE(msec) \ BIAS | 1 | 2 | 5 | 7 |
|---|---|---|---|---|
| 1.6–3.1 | 1 | 2 | 3 | 4 |
| 3.1–6.3 | 2 | 4 | 6 | 8 |
| 6.3–12.7 | 4 | 8 | 12 | 16 |
| 12.7–25.5 | 8 | 16 | 24 | 32 |
COINCIDENCE WINDOW WIDTH IN HUNDREDS OF MICROSECONDS
Fig.8
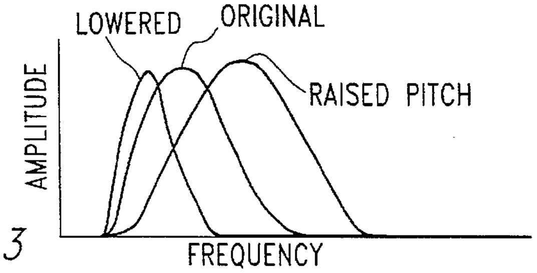
Fig.3

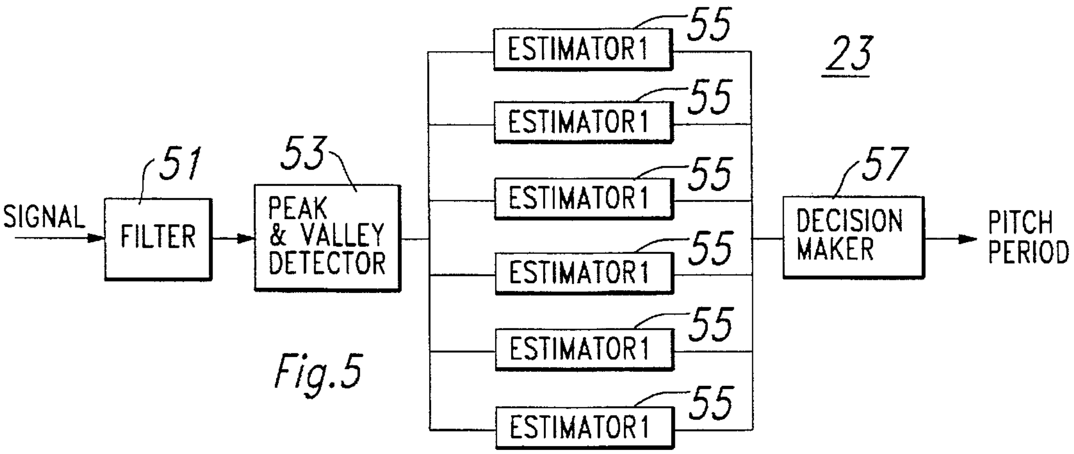
Fig.5
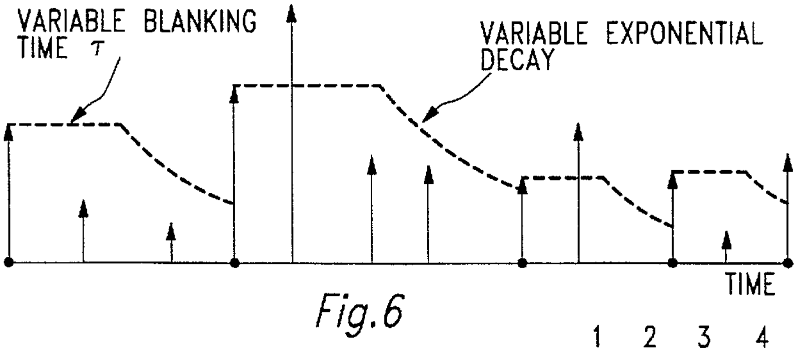
Fig.6
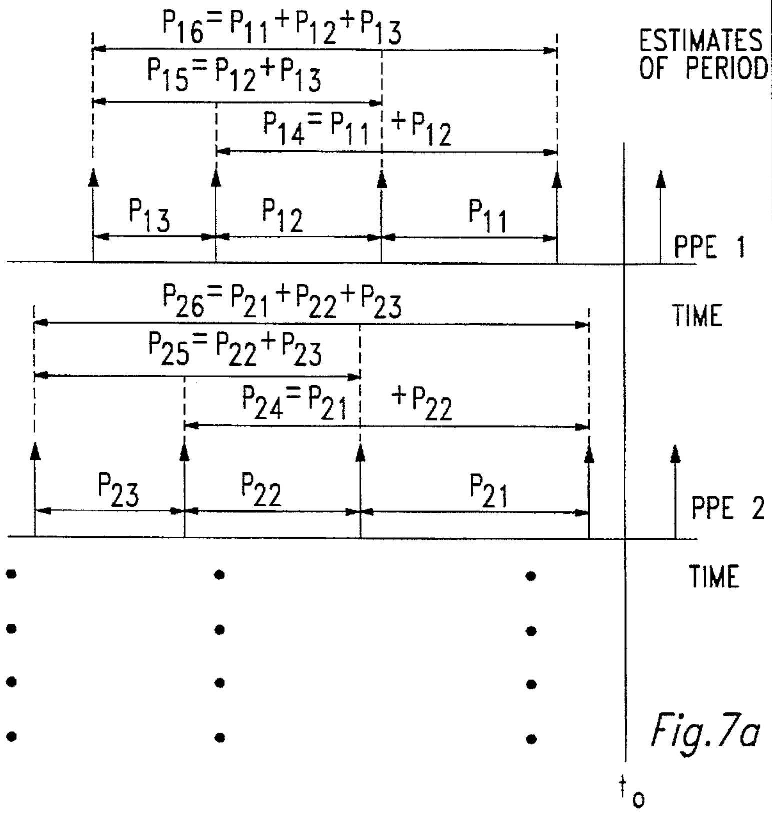
Fig.7a
ESTIMATES OF PERIOD
| 1 | 2 | 3 | 4 | 5 | 6 |
|---|---|---|---|---|---|
| $P_{11}$ | $P_{21}$ | $P_{31}$ | $P_{41}$ | $P_{51}$ | $P_{61}$ |
| $P_{12}$ | $P_{22}$ | $P_{32}$ | $P_{42}$ | $P_{52}$ | $P_{62}$ |
| $P_{13}$ | $P_{23}$ | $P_{33}$ | $P_{43}$ | $P_{53}$ | $P_{63}$ |
| $P_{14}$ | $P_{24}$ | $P_{34}$ | $P_{44}$ | $P_{54}$ | $P_{64}$ |
| $P_{15}$ | $P_{25}$ | $P_{35}$ | $P_{45}$ | $P_{55}$ | $P_{65}$ |
| $P_{16}$ | $P_{26}$ | $P_{36}$ | $P_{46}$ | $P_{56}$ | $P_{66}$ |
Fig.7b

AUTOKEYING FOR MUSICAL ACCOMPANIMENT PLAYING APPARATUS

TECHNICAL FIELD OF THE INVENTION

This invention relates to musical accompaniment playing apparatus and more particularly to autokeying of such apparatus.

BACKGROUND OF THE INVENTION

One so called music accompaniment playing apparatus is referred to as "Karaoke" apparatus. This apparatus is particularly popular in Asian countries such as Japan, Korea, Hong Kong and Taiwan, and is often a part of their home entertainment system. Manufacturers of these "Karaoke" machines are exploring new technologies to enhance their products and differentiate them from competitors in this fast growing market.

FIG. 1 is a block diagram according to the prior art showing the configuration of a "Karaoke" machine 10 which includes a laser video disc musical accompaniment playing apparatus 11. This laser video disc musical accompaniment playing apparatus 11 comprises a laser video disc automatic player for accommodating therein a plurality of laser video discs serving as a musical accompaniment playing information memory medium. The machine 10 includes a controller 12 for controlling the laser video disc automatic player 11 to allow it to select a desired laser video disc 11*a*. A laser video disc automatic player 11 request is inputted from a user operation input terminal via controller 12. The machine 10 further includes a signal processor 13 including a mixer 13*a* and amplifiers 13*b*, left and right speakers 14 for outputting as sound a reproduced audio signal, an image display unit 15 for displaying a reproduced image signal from the video disc as an image, and a microphone 16 for coupling a user's singing voice as input to signal processor 13. The mixer 13*a* mixes the background audio signal from the laser video disc automatic changer 11, which is a musical signal from the music accompaniment player 11, and the audio signal of a voice singing into the microphone 16, and outputs to speakers 14 via amplifiers 13*b*.

In accordance with another Karaoke machine the player 11 is a CD automatic changer or audio cassette player for accommodating therein a plurality of compact discs or audio cassettes serving as a musical accompaniment playing information memory medium and reproducing them. The controller 12 controls the CD automatic changer or cassette player to allow it to select the desired compact disc or audio cassette and the CD changer or cassette player by a request inputted from the user input. The signal processor 13 and speakers 14 output and reproduce audio signal as sound. In some embodiments a graphic decoder 15*a* (in dashed lines) converts graphic data reproduced from a subcode data in the compact disc to an image signal that is displayed on image display 15. A more detailed description of a Karaoke machine may be found in various patents such as U.S. Pat. No. 5,194,682 of Oakamura et al. incorporated herein by reference. In many Karaoke machines, there is a facility for manually changing the "key" or pitch of the background music, so as to match the key of the singer or user. This is done by using a control on the front panel of the Karaoke machine, and involves pressing a push button and/or moving a slider control to go more positive (+) to increase the pitch or more negative (–) to lower the pitch. This feature is referred to as "manual" keying since it requires the user to explicitly depress the button or control and select a pitch. In the prior art there is at least one autokeyer as described in U.S. Pat. No. of 5,296,643 of Kuo et al. In that embodiment the singer's voice is analyzed to determine the singer's voice range.

It is desirable to provide an improved autokeyer (perhaps at a lower cost) where the singer's voice range does not have to be determined.

SUMMARY OF THE INVENTION

In accordance with one embodiment of the present invention, an autokeying feature is provided wherein the system automatically adjusts the key of the background music based on the measurement of the key of the actual singer or user. In accordance with one embodiment, the average pitch period of the singer or user is determined. This average pitch is compared to that of a reference pitch to determine if there is a mismatch and when this occurs the mount of mismatch is used to change the key of the background music to match the key of the singer or user.

DESCRIPTION OF THE DRAWINGS

In the drawings:

FIG. 1 is a block diagram of a Karaoke system;

FIG. 2 is a block diagram of autokeyer in a Karaoke system in accordance with one embodiment of the present invention;

FIG. 3 is a spectral plot of amplitude versus frequency;

FIG. 4 is a flow diagram of the key changer of FIG. 2;

FIG. 5 is a block diagram of the pitch detector of FIG. 2;

FIG. 6 illustrates the operation of the key detection circuit;

FIGS. 7A and 7B illustrate a final estimation of pitch period; and

FIG. 8 illustrates a table of coincidence window widths.

DESCRIPTION OF PREFERRED EMBODIMENTS OF THE PRESENT INVENTION

Figure 2A:
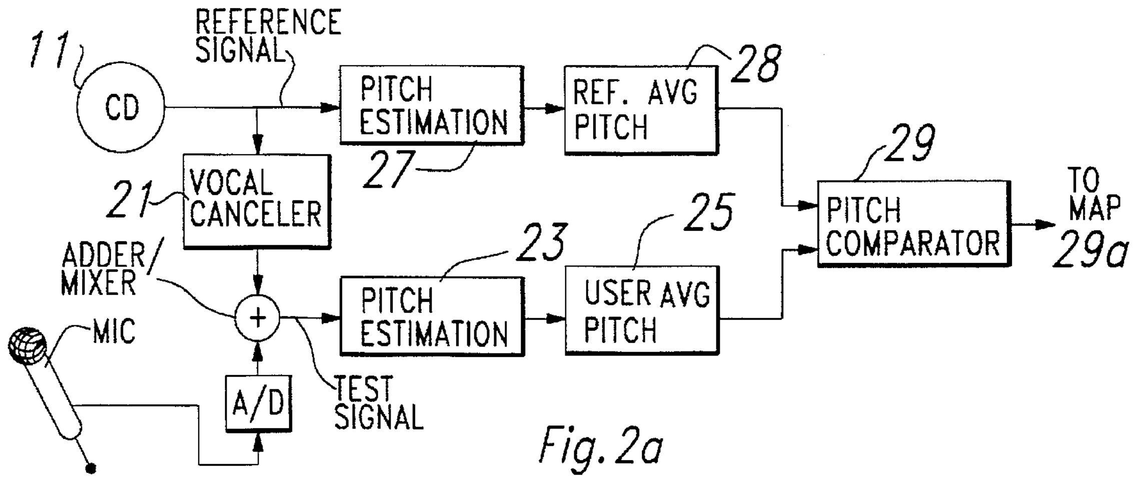
FIG. 2A is a block diagram of an alternate embodiment to determine pitch mismatch.

Referring to FIG. 2 there is illustrated an autokeyer 26 in accordance with one embodiment of the present invention. The signal processor 13 of FIG. 1 may include the autokeyer 26 and a vocal canceler 21. The vocal canceler cancels the voice if the player is playing, for example a typical CD with the artist's voice and the background music mixed together. In some cases, the CD or cassette tape has a special track for only the background music. In that case, no vocal canceler is required. The vocal canceler may provide voice cancellation by subtracting the right channel from the left channel, under the assumption that the voice signal is balanced on both channels. In accordance with one embodiment of Applicant's invention, the pitch of the Karaoke user's voice is determined by pitch estimator 23 and averaging the results at averaging circuit 25. The pitch of the artist's vocal can be similarly determined by a pitch estimator 27 and averaging circuit 28, or by entering the key of the song or background music which may be available on the song package or enclosed literature. The key of the music may also be stored in the CD data field so not have to be computed. The pitch estimated and averaged from the original artist's voice or key from the background music or that from the CD data field is compared to the averaged pitch of the Karaoke singer's voice from average circuit 25 at comparator 29 to determine the mismatch between the two pitches, and based on the mismatch a signal is provided to key changer 31 The amount of key change necessary may be determined at the mapper 29*a* and is applied to key changer 31 to change the key of background music. In one preferred embodiment, the signal may be determined in the mapper as the ratio of the pitch values of the artist and the Karaoke singer, and this is applied to the key changer 31. The output from the key changer is applied to the mixer 13*a* to add the user's vocal.

In accordance with another embodiment the pitch mismatch may be determined according to FIG. 2A where the output from the player 11 is passed through a vocal canceler to get the background music. This output is then mixed with output from the Karaoke singer's microphone to obtain a test signal x comprising background music plus Karaoke singer's voice. The average pitch of the reference signal r and signal x may then be compared to determine the mismatch.

An octave is divided equally into 12 semitones including whole and half steps (sharps or flats). At the pitch averaging circuits 25 and 28 we get the key of the Karaoke singer and the artist's voice and determine by comparison the difference or ratio and change accordingly the key of the background music. A pitch shifting technique is used for changing the key of the background music. The basic idea is to increase or decrease the overall pitch frequency of the music signal to the correct ratio according to the singer's choice of up or down a certain number of semitones in the manual keying case or according to the computed pitch ratio in the autokeying case. There are twelve semitones in one octave, and the pitch difference of one octave is a factor of two. That means, if C2 is one octave higher than C1, then C2=2*C1. And since the ratio of adjacent semitones are the same, that is, C#/C=D/C#=D#/D= . . . =B/A#=2C/B=r; then $r^{12}=2$ and $r=2^{1/12}=1.059$. Therefore, for example, if the singer chooses to shift up by 4 semitones, the ratio of pitch change should be $1.059^4$ and to shift down by 3 semitones, the ratio will be $1/1.059^3$.

The challenge is to change the pitch of the signal without changing the duration of the signal or add undesirable distortions. There are several approaches to changing the pitch of a signal. The simplest method of changing the pitch of recorded speech is to play the material at a higher speed than the speed with which the original recording was made. For example, in an analog tape recorder, the pitch of the original recording can be raised by playing the tape at a higher speed; similarly, the pitch can be lowered by playing the tape at a slower speed. When the signal is sped up, all frequency components in the speech signal are proportionately scaled-up. This is shown in FIG. 3. With a small amount of speed change, say +10%, we can easily perceive the change in pitch. Larger amounts of speed change result in distortion. Most of the techniques follow this basic principle.

In the digital domain, the original signal is either decimated or interpolated, but played back at the original sampling rate in order to achieve the desired shift in pitch.

Briefly, the different approaches to pitch shifting are:

Variable Playback Sampling Rate (VPSR),

Direct Resampling,

Direct Resampling followed by time-scale modification,

Residual Resampling,

Phase Vocoder, and

Least-squares error estimation from modified short-time Fourier transform.

In the variable playback sampling rate method, the sampling rate of the DAC (digital to analog converter) is appropriately changed to achieve the desired shift in pitch. In order to raise the pitch, the output sampling rate is increased. In order to lower the pitch, the output sampling rate is lowered. Although this method appears to be dubiously simple, it has certain drawbacks. First the duration of the output signal is altered; when the pitch is raised, by increasing the output sampling rate, the duration of the output signal is reduced, compared to the original duration of the input signal. In addition to the above drawback, the output filter's cut-off frequency must track changes in the output sampling rates. High quality output filters are difficult to design and expensive to manufacture.

In the direct resampling method, the output sampling rate of the DAC is held constant, thereby alleviating the drawbacks of the previous method. The input signal is however either decimated (for raising the pitch) or interpolated (for lowering the pitch). This method has the drawbacks that the duration of the output signal is altered and the spectral envelope of the original signal is modified, as shown in FIG. 3.

The direct resampling followed by time-scale modification approach is based on the Direct Resampling approach; however the output of the decimator (interpolator) is expanded (compressed) in order to have an output signal duration that is equal to the input signal duration. A popular technique for modifying the time-scale of a signal is Synchronized Overlap & Add, SOLA. See "Time-Scale Modification in Medium to Low Rate Speech Coding", by John Makhoul and Amro El-Jaroudi in Proc. ICASSP'86, pp. 1705–1708.

Synchronized OLA (SOLA) achieves time scale modification while preserving the pitch. Synchronization is achieved by concatenating two adjacent frames at regions of highest similarity. In this case, similar regions are identified by picking the maximum of a cross-correlation function between two adjacent frames over a specified range.

When applying SOLA, choice N, the flame-size, is an important factor. In general, N must be at least twice the size of the pitch period of the sound; e.g., for a 1 KHz sine wave, sampled at 44.1 KHz, N must be approximately 100 samples. If N is smaller than this, the lower frequency portion of the signal is affected.

For speech, the optimum value for N appears to be 20 ms (milliseconds). For music, containing low frequency sounds, we found through experimentation that N had to be increased to 40 ms.

The residual resampling method tries to alleviate the drawback of the previous method by resampling and time-scale modifying the residual of the LPC (Linear Predicting Coding) model. The poles of the LPC model help maintain the original spectral envelope in the modified signal.

The residual of the LPC model contains the pitch and is also known to be almost spectrally flat. Hence, the residual signal is shifted and time-scale modified, and the output is resynthesized using the LPC parameters and the modified residual.

The method has been applied for speech signal and found to produce good quality pitch shifted signals, typically using a 10th order LPC model and a 20 ms analysis frame. It is felt that a higher model order, perhaps around 28, and a higher sampling rate, may serve the purpose.

In the first attempt to apply the re-sampling and TSM to music signals, we experienced serious distortions. The distortions happened only after the TSM process. We conducted a detail study of the correlation function at every search of each frame in the TSM. We discovered that the correlation window is not long enough to accommodate the lowest frequency component in the signal. This results in a wrong search of the peak of the cross-correlation function and thus the signal is not added at the correct point. The solution to this problem is to increase the correlation window. After doing this, we obtained very satisfactory results.

A problem of working with music signals is the enormous amount of computation. The standard sampling frequency used in compact discs is 44.1 kHz for each of the left and right channel. The amount of data is more than ten times that of the voice signal at 8 kHz. In order to enable the TSM to run in real-time, a coarse/fine search for the maximum of the cross-correlation function is suggested. Considering that the cross-correlation function is continuous, a coarse search for the peak can first be performed and then followed by a fine search around the coarse peak.

The phase vocoder method is explained quite well in the reference entitled "The Use of the Phase Vocoder in Computer Music Applications", James A. Moorer, Journal of the Audio Engineering Society, Jan/Feb. 1978, volume 26, Number ½. It has been observed that the output quality was acceptable at 8 KHz using 128 filters of 30 Hz bandwidth. The computational demand at 8 KHz does not facilitate implementing this algorithm on a single Digital Signal Processor (DSP). At higher sampling rates, which is necessary for music, the computational demand is prohibitive.

The least-squares error estimation from modified short-time Fourier transform method by Griffin and Lim entitled "Signal Estimation from Modified Short-Time Fourier Transform", Griffin and Lim, IEEE Trans. Acoust., Speech Processing, Vol. ASSP-32, No. 2, April 1984, pp. 236–243. may produce somewhat better quality of pitch modified signals but at the expense of huge computational complexity.

As illustrated by the flow chart of FIG. 4, an LPC (Linear Predictive Coding) analysis 41 is performed where samples are predicted based on past data samples. The system tracks every sample and tries to predict in terms of past few samples. The predicted sample value $\hat{s}(n)=a_1s(n-1)+ \ldots +a_{10}s(n-10)$ where $a_1, a_2 \ldots a_{10}$ are predictor coefficients and s(n) is the predicted sample and s(n−1) is the previous sample, etc. Over a 20 millisecond period (a frame) there are 160 samples for a sampling rate of 8,000 samples per second. The coefficients $a_1$ $a_2, \ldots, a_{10}$ are computed by minimizing the mean square value of the prediction error $s(n)-\hat{s}(n)$ over the analysis frame. The LPC analysis splits the music signal into spectral information represented by LPC coefficients and residual signal information. What is left over, or error signal, is what you cannot predict or original signal value s(n) minus the predicted value $\hat{s}(n)$ is the residual signal value, or error signal e(n). If you put the two together in the LPC synthesis 43, we get the original signal back. For key shifting, the LPC coefficients are passed through to the LPC synthesis 43. Pitch conversion is done in the time domain on the residual signal, which is obtained by passing the input signal through the LPC inverse filter. The principle of re-sampling is applied to accomplish pitch conversion by changing the number of samples while keeping the sampling frequency a constant. In other words, if we want to change the pitch frequency by a ratio of r, then we simply re-sample at step 45 the signal by a ratio of 1/r. This ratio 1/r is expressed in terms of a rational ratio U/D where U and D are integers. The input signal is first up-sampled by a factor of U by inserting U−1 zero valued samples between each pair of input samples. This signal is then filtered (Step 45) with an FIR (Finite Impulse Response) low-pass filter whose cutoff frequency is at $U*f_s/2D$ or $f_s/2$, whichever is smaller, where $f_s$ is the sampling frequency. The output of the low-pass filter is then down-sampled at Step 45 by a factor of D by throwing away D-1 samples and keeping one sample for every D samples. As a result, the total number of samples is changed by a factor of U/D, and so does the pitch period. That means the resulting signal is at a correctly shifted pitch but at a wrong duration. Hence, we must restore the original duration by a time-scale modification (TSM) process. In this case the synchronized overlap add (SOLA) method of TSM is employed, in which overlapping frames of the signal are shifted and added at points of highest cross-correlation.

For up-sampling, where U=2 and D is 3, for every sample you put one zero next to every input sample. If, for example, we have 3 original samples; after upsampling with U=2 we will have 6 samples. The low-pass filter smooths out the curve. After filtering, it is down-sampled by three. Keep the first sample and throw away the next two samples, etc. This shortens the pitch period. It is ⅔ shorter. The pitch frequency, therefore, goes up by 50 percent, as the pitch period and the frequency are inversely related. If you want to change the pitch frequency by ½, put one zero for every non-zero sample, do the low-pass filtering, and supply that to the LPC synthesizer (more on synthesizer operation later). If you want to increase the pitch by two, first do the low-pass filtering and then remove every other sample. The pitch modified residual is added back to the LPC spectrum at the LPC synthesis 43. The time scale is then restored in the time scale modification step 47. One method is the synchronized overlap add (SOLA) method discussed above.

The synchronized overlap add (SOLA) method of TSM consists of shifting and averaging overlapping frames of a signal at points of highest cross-correlation. Simple shifting and adding frames would achieve the goal of modifying the time scale but it would not preserve pitch periods, spectral magnitude, or phase. Therefore, it would be expected to produce poor quality speech. However, adding frames in a synchronized fashion at points of highest cross-correlation serves to preserve the time-dependent pitch and the spectral magnitude and phase to a large degree.

In this method the music signal x(n) is to be time-scale modified by a factor alpha to give the signal y(n). Alpha>1 corresponds to time expansion and alpha<1 corresponds to time compression. Overlapping frames of size N are taken every $S_a$ ssmples of x(n), where $S_a$ is the analysis interval. If $S_s$ is the synthesis interframe interval, then $S_s$ is related to $S_a$ by $S_s=S_a$*alpha. These intervals imply that we take a frame of size N of x(n) every $S_a$ samples and use it to construct y(n) every $S_s$ samples. The synthesis is performed on a frame-by-frame basis, where each new analysis frame is added to the previously computed reconstructed signal. The algorithm is initialized by setting y(j)=x(j), $0 \leqq j \leqq N-1$, at the zeroth frame. Let $x(mS_a+j)$, $0 \leqq j \leqq N-1$, denote the mth frame of the input signal. Then, $x(mS_a+j)$ is synchronized and averaged with a neighborhood of $y(mS_s+j)$. The alignment is obtained by first computing the normalized cross-correlation between $x(mS_a+j)$ and $y(mS_s+j)$ as follows:

$$R_m(k)=\frac{\sum_{j=0}^{L-1} y(mS_s+k+j)*x(mS_a+j)}{\left[\sum_{j=0}^{L-1} y^2(mS_s+k+j)*\sum_{j=0}^{L-1} x^2(mS_a+j)\right]^{1/2}}$$

where $R_m(k)$ is the normalized cross-correlation at frame m, and L is the number of points used to compute each cross-correlation (points of overlap between $y(mS_s+k+j)$ and $x(mS_a+j)$ ). We used $-130 \leqq k \leqq -20$.

Let $K_m$ denote the lag at which $R_m(k)$ is maximum. Then $x(mS_a+j)$ is weighted and averaged with $y(mS_s+K_m+j)$ along their points of overlap:

$$y(mS_s+K_m+j)=(1-f(j))*y(mS_s+K_m+j)+f(j)*x(mS_a+j),\ 0\leqq j\leqq L_m-1$$

$$y(mS_s+K_m+j)=x(mS_a+j),\ L_m\leqq j\leqq N-1.$$

where $L_m$ is the range of overlap of the two signals, and f(j) is a weighing function such that $0\leqq f(j)\leqq 1$.

The cross-correlation function as defined above will falsely indicate a high correlation between x and y when L is small, which could lead to errant synchronization. To remedy this situation, we restricted L to be greater than N/8.

The choices of $S_a$ and $S_s$ will depend on alpha and N. In general, a smaller $S_a$ will result in higher quality, but at the expense of increased computation. So, in practice, one would like to maximize $S_a$ without affecting the quality significantly. As a rule of thumb, we set $S_a$=N/2 when alpha<1, and we set $S_a$=N/2*alpha when alpha>1.

The choice of the averaging function f (j) proved critical for the quality of the regenerated music. Simple averaging (f (j)=0.5 for all j) gave poor results; the output speech was highly reverberant and coarse. Averaging functions that provided smoother transitions between successive frames resulted in much higher quality. For example, a raised cosine function ($f(j)=-0.05\cos(\Pi^* j/L_m+0.5)$) and a linear function ($f(j)=j/L_m$) both provided good results. The raised cosine function is more complicated to compute and offered no specific advantages. So, the linear function is preferred.

Any one of the above approaches to key-shifting can be used. In one embodiment, we have used Direct Resampling followed by TSM approach to shifting the key of the background music.

Referring to FIG. 5, there is illustrated the pitch detector 23 of FIG. 2. The system measures the pitch period of the user's vocal signal for 10 seconds, for example, and based on this computes the average pitch. The pitch is detected, for example, using a technique described by Gold and Rabiner in Vol. 46, No. 2 (Part 2) of The Journal of the Acoustical Society of America, 1969, pp 442–448, entitled, "Parallel Processing Techniques for Estimating Pitch Period of Speech in the Time Domain." The system comprises low-pass filter 51 to extract the first formant region. The low-pass filtered waveform is processed by peak and valley detector 53. Six sets of peak and valley measurements are extracted. There are six "simple" identical pitch-period estimators 55, each working on one of the six sets from detector 53. Each estimator is a peak detecting rundown circuit. As seen in FIG. 6, following each detected pulse there is a blanking interval followed by a simple exponential decay. Whenever a pulse exceeds the level of the rundown circuit (during the decay), it is detected and the rundown circuit is reset. The rundown time constant and the blanking time of each detector are functions of the smoothed estimate of pitch period of the detector. The final pitch-period computation is based on examination of the results from each "simple" pitch-period estimator and a majority rule voting is done to determine pitch based on the six decisions. The final computation is performed at decision maker 57, which may be thought of as a computer with a memory, an arithmetic logic algorithm and control hardware to steer the incoming signals. At any time $t_0$ an estimate of pitch period is made by:

1. Forming a 6×6 matrix of estimates of pitch period. See FIG. 7B. The columns of the matrix represent the individual detectors and the rows are estimates of period. The first three rows are the three most recent estimates of period. The fourth row is a sum of the first and second rows; the fifth is the sum of the second and third rows; and the sixth row is a sum of the first three rows. The technique for forming the matrix is illustrated in FIG. 7A. The reason for the last three rows of the matrix is that sometimes the individual detectors will indicate second or third harmonic rather than fundamental and it will be entries in the last three rows which are correct rather than the three most recent estimates of pitch period.
2. Comparing each of the entries in the first row of the matrix to the other 35 entries of the matrix and counting the number of coincidences. That particular $P_{i1}$(i=1,2, 3,4,5,6) that is most popular (greatest number of coincidences) is used as the final estimate of pitch period.

To determine whether two pitch-period estimates "coincide" one may observe their ratios rather than their differences. However, the ratio measurement can be very approximate to avoid the need of a divide computation. Because during many parts of the speech there are sizable variations of successive pitch-period measurements, it is useful to include several threshold values to define coincidence, and then try to select, for each over-all pitch-period computation, the threshold which yields the most consistent answer. With this explanation, we now define the computation of Block 57 of FIG. 5.

FIG. 8 shows a table of 16 coincidence window widths. As indicated in FIG. 7, only the most recent estimated pitch period from a given detector is a "candidate" for final choice. This candidate is thus one of six possible choices for the "correct" pitch period. To determine the "winner," each candidate is numerically compared with all of the remaining 35 pitch numbers. This comparison is repeated four times, corresponding to each column in the table of FIG. 8. From each column, the appropriate window width is chosen as a function of the estimate associated with the candidate.

After the number of coincidences is tabulated, a bias of 1 is subtracted from that number. The measurement is then repeated for the second column; this time the windows are wider, increasing the probability of coincidence, but, in compensation, a bias of 2 is subtracted from the compilation. After the computation has been repeated in this way for all four columns, the largest biased number is used as the number of coincidences that represents that particular pitch-period estimate. The entire procedure is now repeated for the remaining five candidates, and the winner is chosen to be that number with the greatest number of biased coincidences.

Every 20 milliseconds (1/50th of a second) this estimation is done and the average of the decision made every 20 milliseconds is computed over, say, 10 seconds i.e., 50×10 or 500 values are averaged. This determines the pitch of the voice. The mapping function at mapper 32 of FIG. 2 simply takes a ratio of the user's voice key to the artist's or background music. That ratio change is applied to the key changer to alter the samples as shown and discussed in connection with FIG. 4 on pitch shifting means described.

The signal processor 13 may include one or more DSP's for performing the functions described above.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of changing pitch of prerecorded background music so as to match the pitch of the singer/user comprising the steps of:

measuring the average pitch period of the singer/user for a predetermined period of time to provide average pitch;

said measuring step comprises the steps of low pass filtering voice signal of singer/user, generating functions of peaks of the filtered voice signal, pitch period estimating said functions, and computing final pitch period based on the results from each pitch period estimation;

providing a reference pitch matching that of the background music;

comparing said average pitch of the singer/user to that of a reference pitch to provide a mismatch signal; and shifting the background music to match that of the singer/user using said mismatch signal.

2. The method of claim 1 wherein said measuring steps are done every 20 milliseconds to determine a pitch and the average of pitches is taken over a 10-second period to provide said average pitch.

3. The method of claim 1 wherein said shifting of background music includes the steps of:

splitting spectral signal information from residual signal information, changing number of digital samples of the residual signal while keeping the sampling frequency constant, low pass filtering, recombining the spectral signal information and the modified residual signal information and time scale modifying the combined signal.

4. The method of claim 1 wherein said means for providing a reference pitch includes measuring original artist's average pitch for a predetermined period of time.

5. The method of claim 1 including vocal canceling of prerecorded music before changing the pitch to remove the original artist's voice.

6. A method of changing pitch of prerecorded background music so as to match the pitch of the singer/user comprising the steps of:

measuring the average pitch period of the singer/user for a predetermined period of time to provide average pitch;

providing a reference pitch matching that of the background music;

comparing said average pitch of the singer/user to that of a reference pitch to provide a mismatch signal; and shifting the background music to match that of the singer/user using said mismatch signal;

said shifting of background music includes the steps of:

splitting spectral signal information from residual signal information, changing number of digital samples of the residual signal while keeping the sampling frequency constant, low pass filtering, recombining the spectral signal information and the modified residual signal information and time scale modifying the combined signal.

7. The method of claim 6 wherein said time scale modifying step modifies the signal using appropriately selected analysis frame size.

8. The method of claim 7 wherein the frame size is twice the average pitch period.

9. The method of claim 8 wherein the frame size is 20 ms for voice and 40 ms for low frequency background music.

10. A Karaoke system comprising;

a Karaoke device including a display for displaying Karaoke words and a prerecorded music player for playing pre-recorded music, a microphone for picking up a Karaoke singer's voice, a mixer for mixing microphone output to that from said player, and speakers for hearing the output from said mixer;

a pitch detector coupled to said microphone for detecting an average pitch of the Karaoke singer's voice;

said pitch detector includes a low pass filter, means for generating functions of peaks of the filtered voice, means for pitch estimating said functions and means for computing final pitch period based on pitch period estimating;

means for detecting pitch of pre-recorded music;

a comparator for comparing the pitch of the pre-recorded music to said Karaoke singer's average pitch to provide a mismatch signal; and a key changer coupled between said microphone and said mixer and responsive to said mismatch signal to change the key of the background music to match that of the Karaoke singer;

said key changer including means for splitting spectral signal information from residual signal information, changing number of digital samples of the residual signal while keeping the sampling frequency constant, low pass filtering, recombining the spectral signal information and the modified residual signal information and time scale modifying the combined signal.

11. A system for changing the key of the background music to match that of a singer comprising:

a device for playing pre-recorded background music;

a microphone for picking up a singer/user's voice, a mixer for mixing the microphone output with the background music from said player to be heard from speakers;

a pitch detector for detecting the pitch of singer/user's voice;

said pitch detector includes a low pass filter, means for generating functions of peaks of the filtered voice, means for pitch estimating said functions and means for computing final pitch period based on pitch period estimating;

means for providing a reference pitch;

a comparator responsive to the detected pitch of said singer/user's voice and that of said reference pitch for providing a mismatch signal; and a key changer coupled between said microphone and mixer and responsive to said mismatch signal to change the key of the background music to match that of said singer/user;

said key changer includes splitting spectral and residual signal information, changing samples of the residual signal data of the residual signal information while keeping sampling frequency constant, low passing filtering the modified residual signal information, recombining the spectral and residual signal information and modifying the time scale of the combined signal.

12. The system of claim 11 wherein:

said pitch detector includes low pass filter, peak and valley detector, six estimators and a majority voting.

13. The system of claim 11 wherein said modifying the time scale uses appropriately selected analysis frame size.

14. The system of claim 13 wherein said frame size is twice the average pitch period.

15. The system of claim 14 wherein said frame size is 20 ms for voice and 40 ms for certain background music.

* * * * *